United States Patent
Jiang

(10) Patent No.: US 9,499,174 B2
(45) Date of Patent: *Nov. 22, 2016

(54) METHOD AND APPARATUS FOR ISOLATING A FAULT-ACTIVE CONTROLLER IN A CONTROLLER AREA NETWORK

(75) Inventor: Shengbing Jiang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/425,676

(22) PCT Filed: Sep. 5, 2012

(86) PCT No.: PCT/US2012/053729
§ 371 (c)(1),
(2), (4) Date: Mar. 4, 2015

(87) PCT Pub. No.: WO2014/039032
PCT Pub. Date: Mar. 13, 2014

(65) Prior Publication Data
US 2015/0258999 A1    Sep. 17, 2015

(51) Int. Cl.
*G06F 11/00* (2006.01)
*B60W 50/029* (2012.01)
(Continued)

(52) U.S. Cl.
CPC ........ *B60W 50/029* (2013.01); *G05B 19/0428* (2013.01); *G06F 11/076* (2013.01); *G06F 11/0739* (2013.01); *H04L 12/40* (2013.01); *H04L 43/0847* (2013.01); *H04L 43/16* (2013.01); *B60W 2050/0006* (2013.01);
(Continued)

(58) Field of Classification Search
CPC ................... B60W 50/029; B60W 2050/0295; B60W 2050/0006; B60W 2050/0045; H04L 43/0847; H04L 43/16; H04L 12/40; H04L 2012/40273; G05B
(Continued)

(56) References Cited

U.S. PATENT DOCUMENTS 5,574,848 A * 11/1996 Thomson .......... H04L 12/40013
714/2
9,009,523 B2 * 4/2015 Jiang ................... G06F 11/2005
714/4.5
(Continued)

*Primary Examiner* — Michael J Zanelli

(57) ABSTRACT

A method for monitoring communications among a plurality of controllers signally linked to a communication bus of a controller area network includes monitoring bus communications including determining bus error counts for a plurality of execution cycles. When a bus error count associated with message transmission from one of the controllers exceeds a predetermined threshold, the one of the controllers is prohibited from communicating on the communications bus for a predetermined period of time and is included in a subset of candidate fault-active controllers. Any of the plurality of controllers included within the subset of candidate fault-active controllers that successfully transmits a message is removed from the subset of candidate fault-active controllers. A fault-active controller is isolated based upon the subset of candidate fault-active controllers and the bus error counts.

8 Claims, 3 Drawing Sheets

(51) Int. Cl.
  *G06F 11/07*  (2006.01)
  *G05B 19/042*  (2006.01)
  *H04L 12/26*  (2006.01)
  *H04L 12/40*  (2006.01)
  *B60W 50/00*  (2006.01)

(52) U.S. Cl.
  CPC ............... *B60W 2050/0045* (2013.01); *B60W 2050/0295* (2013.01); *H04L 2012/40273* (2013.01)

(58) Field of Classification Search
  CPC ............ 19/0428;G06F 11/076; G06F 11/0739
  See application file for complete search history.

(56) References Cited

U.S. PATENT DOCUMENTS

| | | | |
|---|---|---|---|
| 2008/0186870 A1* | 8/2008 | Butts | H04L 41/0659 370/252 |
| 2009/0106606 A1* | 4/2009 | Duan | G06F 11/0739 714/48 |
| 2009/0183033 A1 | 7/2009 | Ando | |
| 2010/0106787 A1 | 4/2010 | Grohman | |
| 2011/0188371 A1* | 8/2011 | Brunnberg | H04L 12/40006 370/216 |

* cited by examiner

METHOD AND APPARATUS FOR ISOLATING A FAULT-ACTIVE CONTROLLER IN A CONTROLLER AREA NETWORK

TECHNICAL FIELD

This disclosure is related to communications in controller area networks.

BACKGROUND

The statements in this section merely provide background information related to the present disclosure. Accordingly, such statements are not intended to constitute an admission of prior art.

Vehicle systems include a plurality of subsystems, including by way of example, engine, transmission, ride/handling, braking, HVAC, and occupant protection. Multiple controllers may be employed to monitor and control operation of the subsystems. The controllers can be configured to communicate via a controller area network (CAN) to coordinate operation of the vehicle in response to operator commands, vehicle operating states, and external conditions. A fault can occur in one of the controllers that affects communications via the CAN bus.

SUMMARY

A method for monitoring communications among a plurality of controllers signally linked to a communication bus of a controller area network includes monitoring bus communications including determining bus error counts for a plurality of execution cycles. When a bus error count associated with message transmission from one of the controllers exceeds a predetermined threshold, the one of the controllers is prohibited from communicating on the communications bus for a predetermined period of time and is included in a subset of candidate fault-active controllers. Any of the plurality of controllers included within the subset of candidate fault-active controllers that successfully transmits a message is removed from the subset of candidate fault-active controllers. A fault-active controller is isolated based upon the subset of candidate fault-active controllers and the bus error counts.

BRIEF DESCRIPTION OF THE DRAWINGS

One or more embodiments will now be described, by way of example, with reference to the accompanying drawings, in which.

DETAILED DESCRIPTION

Figure 1:
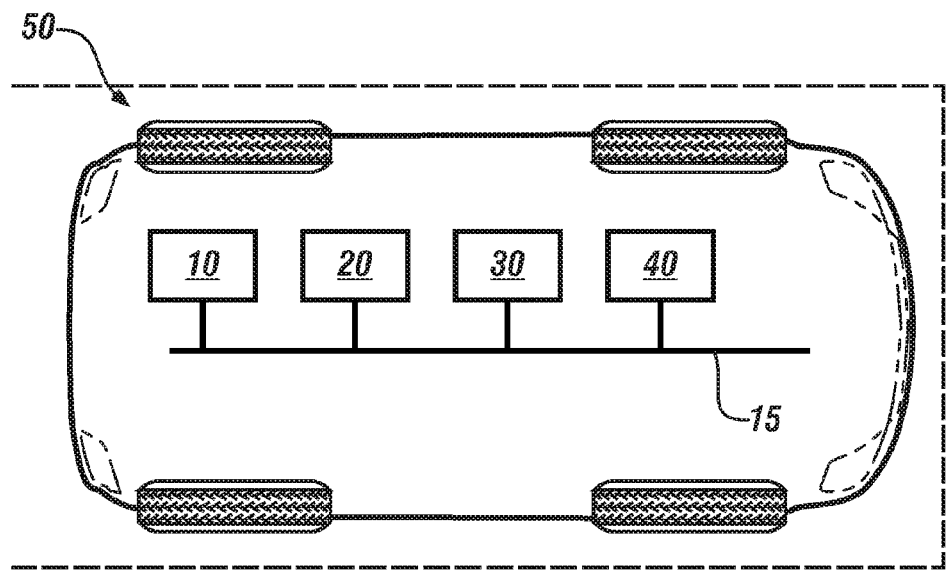
FIG. 1 illustrates a vehicle including a plurality of controllers that are signally connected via a controller area network (CAN), in accordance with the disclosure.

Referring now to the drawings, wherein the showings are for the purpose of illustrating certain exemplary embodiments only and not for the purpose of limiting the same, FIG. 1 schematically shows a vehicle 50 including a plurality of controllers 10, 20, 30 and 40 that are signally connected via a controller area network (CAN) communication bus 15 (CAN bus 15). Each of the controllers 10, 20, 30 and 40 includes an electronic controller or other on-vehicle device that is configured to monitor and/or control operation of a subsystem of the vehicle 50 and communicate via the CAN bus 15. In one embodiment, one of the controllers, e.g., controller 40 is configured to effect bus monitoring, and may be referred to herein as a CAN controller.

The term controller and similar terms including, e.g., control module, module, control, control unit, processor mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

A CAN message has a known, predetermined format that includes, in one embodiment, a start of frame (SOF), an identifier (11-bit identifier), a single remote transmission request (RTR), a dominant single identifier extension (IDE), a reserve bit (r0), a 4-bit data length code (DLC), up to 64 bits of data (DATA), a 16-bit cyclic redundancy check (CDC), 2-bit acknowledgement (ACK), a 7-bit end-of-frame (EOF) and a 3-bit interframe space (IFS). A CAN message can be corrupted, with known errors including stuff errors, form errors, ACK errors, bit 1 errors, bit 0 errors, and CRC errors. The errors are used to generate an error warning status including one of an error-active status, an error-passive status, and a bus-off error status. The error-active status, error-passive status, and bus-off error status are assigned based upon increasing quantity of detected bus error frames, i.e., an increasing bus error count. Known CAN bus protocols include providing network-wide data consistency, which can lead to globalization of local errors. This permits a faulty, non-silent controller to corrupt a message on the CAN bus 15 that originated at another of the controllers. A faulty, non-silent controller is referred to herein as a fault-active controller.

When one of the controllers reaches the bus-off error status, it is prohibited from communicating on the CAN bus 15 for a period of time. This includes prohibiting the affected controller from receiving messages and from transmitting messages until a reset event occurs, which can occur after an a period of time when the controller is inactive. Thus, when a fault-active controller reaches the bus-off error status, it is prohibited from communicating on the CAN bus 15 for a period of time, and is unable to corrupt other messages on the CAN bus during the period of time when it is inactive.

A method of detecting a fault-active controller includes counting a quantity of bus error frames on the CAN bus and monitoring controller status for each of the controllers connected to the CAN bus to isolate a fault-active controller. A controller whose status transitions from active to inactive, i.e., to a bus-off error status, and has a corresponding bus error count that transitions from high to low is a candidate for being a fault-active controller.

Figure 2:
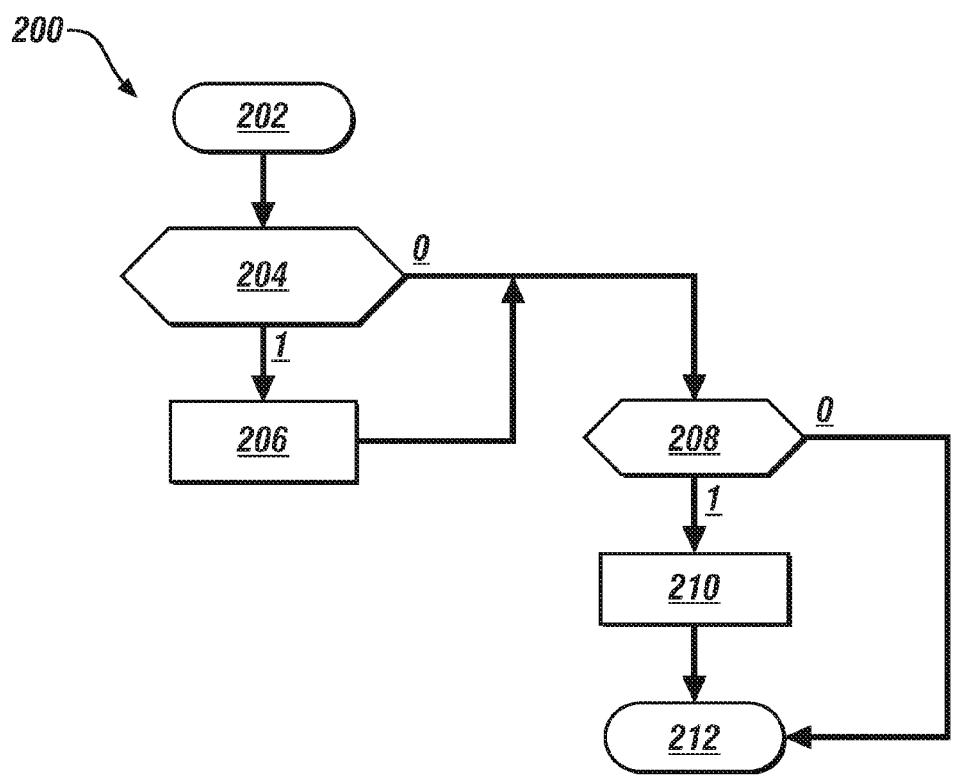
FIG. 2 illustrates an inactive controller detection process to detect whether one of the controllers connected to the CAN bus is inactive, in accordance with the disclosure.

FIG. 2 schematically shows an inactive controller detection process 200, which executes to monitor controller status, including detecting whether one of the controllers connected to the CAN bus is inactive. The inactive controller detection process 200 is preferably executed by a bus monitoring controller, e.g., controller 40 of FIG. 1. The inactive controller detection process 200 can be called periodically or caused to execute in response to an interruption. An interruption occurs when a CAN message is received by the bus monitoring controller, or alternatively, when a supervision timer expires. Table 1 is provided as a key to FIG. 2, wherein the numerically labeled blocks and the corresponding functions are set forth as follows.

TABLE 1

| BLOCK | BLOCK CONTENTS |
|---|---|
| 202 | Start |
|  | Monitor CAN messages |
| 204 | Receive message $m_i$ from controller $C_i$? |
| 206 | $Active_i = 1$ |
|  | $Inactive_i = 0$ |
|  | Reset $T_i = Th_i$ |
| 208 | Is $T_i = 0$ for any controller $C_i$? |
| 210 | For all such controllers $C_i$: |
|  | $Active_i = 0$ |
|  | $Inactive_i = 1$ |
| 212 | End |

Each of the controllers is designated $C_i$, with i indicating a specific one of the controllers from 1 through j. Each controller $C_i$ transmits a CAN message and the period of the CAN message $m_i$ from controller $C_i$ may differ from the CAN message period of other controllers. Each of the controllers $C_i$ has an inactive flag ($Inactive_i$) indicating the controller is inactive, and an active flag ($Active_i$) indicating the controller is active. Initially, the inactive flag ($Inactive_i$) is set to 0 and the active flag ($Active_i$) is also set to 0. Thus, the active/inactive status of each of the controllers $C_i$ is indeterminate. A timer $T_i$ is employed for the active supervision of each of the controllers $C_i$. The time-out value for the supervision timer is $Th_i$, which is calibratable. In one embodiment, the time-out value for the supervision timer is $Th_i$ is set to 2.5 times a message period (or repetition rate) for the timer $T_i$ of controller $C_1$.

The inactive controller detection process 200 monitors CAN messages on the CAN bus (202) to determine whether a CAN message has been received from any of the controllers $C_i$ (204). If not (204)(0), the operation proceeds directly to block 208. When a CAN message has been received from any of the controllers $C_i$ (204)(1), the inactive flag for the controller $C_i$ is set to 0 ($Inactive_i=0$), the active flag for the controller $C_i$ is set to 1 ($Active_i=1$), and the timer $T_i$ is reset to the time-out value $Th_i$ for the supervision timer for the controller $C_i$ that has sent CAN messages (206). The logic associated with this action is that only active controllers send CAN messages.

The system determines whether the timer $T_i$ has reached zero for the respective controller $C_i$ (208). If not (208)(0), this iteration of the inactive controller detection process 200 ends (210). If so (208)(1), the inactive flag is set to 1 ($Inactive_i=1$) and the active flag is set to 0 ($Active_i=0$) for the respective controller $C_i$ (210). When CAN messages have been received from all the controllers $C_i$ within the respective time-out values $Th_i$ for all the supervision timers, inactive controller detection process 200 indicates that all the controllers $C_i$ are presently active. When the supervision timer expires, the inactive controller detection process 200 identifies as inactive those controllers $C_i$ wherein the inactive flag is set to 1 ($Inactive_i=1$) and the active flag is set to 0 ($Active_i=0$), and this iteration of the inactive controller detection process 200 ends (210).

Figure 3:
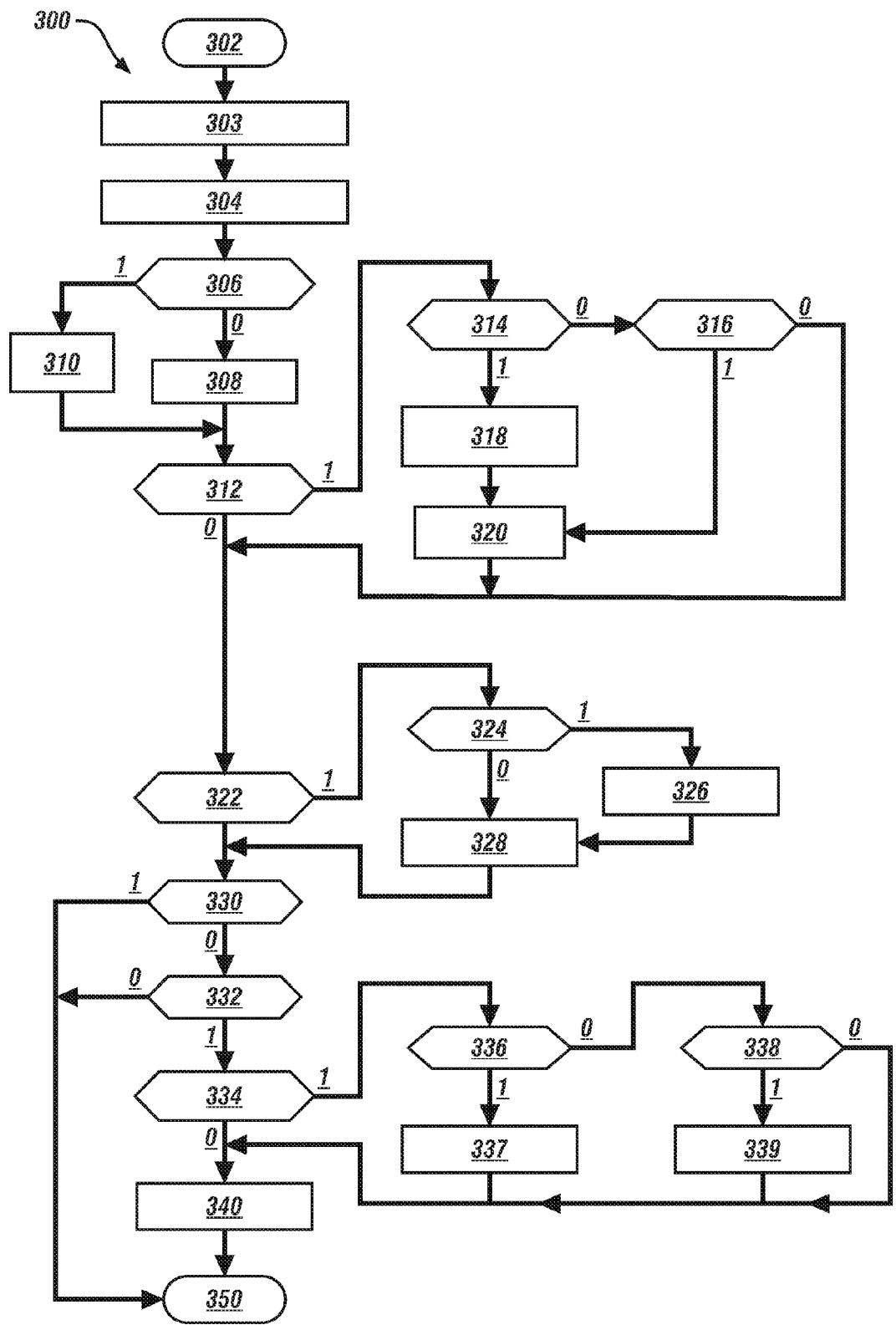
FIG. 3 illustrates a controller isolation process for isolating an inactive controller connected to the CAN bus, in accordance with the disclosure.

FIG. 3 schematically shows a controller isolation process 300 for isolating the inactive controller connected to the CAN bus. The controller isolation process 300 is preferably executed by a bus monitoring controller, e.g., controller 40 of FIG. 1. The controller isolation process 300 runs periodically with a period of $T_d$, which is preferably selected as the minimum of the time-out thresholds (Th) for all the controllers that connect to the CAN bus, i.e., $T_d = \min\{Th_i, i=1, 2, \ldots n\}$, wherein $Th_i$ represents the time-out threshold for the active supervision of corresponding controller $C_i$. Table 2 is provided as a key to FIG. 3, wherein the numerically labeled blocks and the corresponding functions are set forth as follows.

TABLE 2

| BLOCK | BLOCK CONTENTS |
|---|---|
| 302 | Start controller isolation process |
| 303 | Error[i+1] = Error[i] for i = N−1, ...,1 |
| 304 | Error[1] = Bus error count in last cycle |
| 306 | Are all controllers active? |
| 308 | CF = CF −{i| $Active_i$ = 1] |
| 310 | F_Flag = 0 |
|  | F_Pending = 0 |
|  | CF = Empty |
| 312 | Error[1] + Error[2] ≥ $Th_{error\text{-}high}$? |
| 314 | F_Flag = 1? |
| 316 | Error[1] >0? |
| 318 | Output CF as the set of candidate fault-active controllers; |
|  | Set F_Flag = 0 |
| 320 | Set CF = $V_C$; |
|  | Set $Active_i$ = 0 for all controllers $C_i$ |
| 322 | F_Pending =1? |
| 324 | Error[1] ≤ $Th_{error\_low}$? |
| 326 | F_Flag = 1 |
| 328 | F_Pending = 0 |
| 330 | F_Flag = 1? |
| 332 | Any new inactive controller $C_i$? |
| 334 | Error[k] + Error[k+1] ≥ $Th_{error\_high}$ for any k starting from 1 to N−1 ? |
| 336 | Error[j] ≤ $Th_{error\_low}$ for all j=1,...,k? |
| 337 | F_Flag = 1 |
| 338 | k=1? |
| 339 | F_Pending = 1 |
| 340 | Set F_Flag = 0; |
|  | Output: No bus errors on the bus and controller $C_i$ inactive |
| 350 | End |

A record is made of the quantity of bus error frames, i.e., bus error count for N execution cycles with the quantity of execution cycles determined as a maximum of $[Th_i/T_d]+1$ for all the controllers $C_1$, i=1, . . . , n, wherein n represents the quantity of controllers and N represents the maximum number of cycles from the time when the bus error count would cause one of the controllers to achieve bus-off error status to the time when the affected controller is detected as inactive. N is calculated as follows: $N=\max\{[Th_i/T_d]+1,$ i=1, . . . , n}, i.e., error register Error[i], wherein i=1, . . . , N. The error registers Error[i] are employed to keep track of the bus error counts. Initially, the error registers are empty, i.e., Error[i]=0 for all i. Thresholds $Th_{error-high}$ and $Th_{error-low}$ are used to indicate high and low bus error count thresholds, respectively. In one embodiment the high bus error count threshold $Th_{error-high}$ is set at 32 and the low bus error count threshold $T_{error-low}$ is set at 5. A fault pending flag (F_Pending) and a fault active flag (F_Flag) are employed as described herein, and both are initially set to "0." The term $V_C$ represents the set of all controllers $C_i$ that are connected to the bus, and the term CF represents the set of candidate fault-active controllers and initially it is empty.

During each execution of the controller isolation process 300 (302), the bus error counts for the last N cycles are kept and stored in the error registers Error[i], i=1, . . . , N (303) and the bus error count on the CAN bus from the CAN controller (Error[1]) is obtained for the previous $T_d$ time interval (304). The bus error counts for the last N cycles are continually rolled over in the error registers Error[i], i= 1, . . . , N, as i progressively indexes from i=1 through i=N, and then iteratively starts at i=1 again.

The system queries whether all the controllers $C_i$ are active (306), which can include reviewing results from the inactive controller detection process 200 of FIG. 2. When all the controllers $C_i$ are active (306)(1), the fault pending flag is reset (F_Pending=0), the fault active flag is reset (F_Flag=0) and the set of candidate fault-active controllers is emptied (CF=empty) (310). When the controllers $C_i$ are not all active (306)(0), i.e., when one or more of the controllers $C_i$ is inactive, the set of candidate fault-active controllers is updated to include the identified one of the controllers $C_i$ (CF=CF−{i|$Active_i$=1}) (308).

The summation of the bus error count for the previous cycle (e.g., Error[2]) and the bus error count for the present cycle (e.g., Error[1]) are compared to the high bus error count threshold $Th_{error-high}$ (312). When the summation of the bus error counts is greater than or equal to the high bus error count threshold $Th_{error-high}$ (312)(1), it is determined whether the fault active flag has been set (F_Flag=1) (314). When the fault active flag has been set (F_Flag=1) (314)(1), the CF term is output as the set of candidate fault-active controllers and the fault active flag is reset (F_Flag=0) (318). When the fault active flag is set (F_Flag=1) and the bus error count is high, it indicates a fault-active controller is causing bus errors again.

When the fault active flag has not been set (F_Flag=0) (314)(0), it is determined whether the bus error count on the CAN bus from the CAN controller obtained for the previous $T_d$ time interval (indicated by the error register, e.g., Error [1]) is greater than zero (316). When the bus error count on the CAN bus from the CAN controller obtained for the previous $T_d$ time interval (e.g., Error[1]) is greater than zero (316)(1), or after the CF term is output as the set of candidate fault-active controllers and the fault active flag is reset (F_Flag=0) (318), the CF term, i.e., the set of candidate fault-active controllers is updated to include the set $V_C$ of all controllers $C_i$, and the active flag is set to 0 ($Active_i$=0) for all the controllers $C_i$ (320).

When the summation of the previous and present bus error counts is less than the high bus error count threshold $Th_{error-high}$ (312)(0), or when the bus error count on the CAN bus from the CAN controller obtained for the previous $T_d$ time interval (e.g., Error[1]) is zero (316)(0), or subsequent to block 320, it is determined whether the fault pending flag is set (F_Pending=1) (322). When the fault pending flag is set (F_Pending=1) (322)(1), it is determined whether the bus error count on the CAN bus from the CAN controller obtained for the previous $T_d$ time interval (Error [1]) is less than the low bus error count threshold $Th_{error-low}$ (324). When the bus error count on the CAN bus from the CAN controller obtained for the previous $T_d$ time interval (Error[1]) is less than the low bus error count threshold $Th_{error-low}$, (324)(1), the fault active flag is set (F_Flag=1) (326) and the fault pending flag is reset (F_Pending=0) (328). When the bus error count on the CAN bus from the CAN controller obtained for the previous $T_d$ time interval (Error[1]) is not less than the low bus error count threshold $Th_{error-low}$ (324)(0), the fault pending flag is reset (F_Pending=0) without changing the fault active flag (328).

When the fault pending flag is not set (F_Pending=0) (322)(0), or after resetting the fault pending flag (F_Pending=0) (328), the fault active flag is queried to determine whether it has been set (F_Flag=1) (330). If the fault active flag has been set (F_Flag=1) (330)(1), the present iteration of the controller isolation process 300 ends (350). When the fault active flag has not been set (F_Flag=0) (330)(0), the system queries whether one of the controllers $C_i$ is newly inactive (332). When one of the controllers $C_i$ is not newly inactive (332)(0), the present iteration of the controller isolation process 300 ends (350). When one of the controllers $C_i$ is newly inactive (332)(1), it is queried to determine whether the bus error count on the CAN bus from the CAN controller exceeds the high bus error count threshold $Th_{error-high}$, i.e., Error[k]+Error[k+1]≥high bus error count threshold $Th_{error-high}$, for any value of k from 1 through N−1 (334). When the bus error count on the CAN bus from the CAN controller does not exceed the high bus error count threshold $Th_{error-high}$ (334)(0), the fault active flag is reset (F_Flag=0), and the present iteration of the controller isolation process 300 generates an output indicating there are no error frames on the CAN bus and the controller $C_i$ is inactive (340). The present iteration then ends (350).

When the bus error count on the CAN bus from the CAN controller exceeds the high bus error count threshold $Th_{error-high}$ (334)(1), it is queried to determine whether the bus error count on the CAN bus from the CAN controller is less than the low bus error count threshold $Th_{error-low}$ for error counts from j=1 through k (336). When the bus error count on the CAN bus from the CAN controller is less than the low bus error count threshold $Th_{error-low}$ for error counts from j=1 through k (336)(1), a fault flag is set (F_Flag=1) for the controller $C_i$ (337), and the present iteration ends (350). When the fault flag is set (F_Flag=1) for the controller $C_i$, it indicates that a fault-active controller has caused bus errors and it is presently among the set of inactive controllers. When the fault flag is set (F_Flag=1), if the bus error count is high again, it indicates the fault-active controller is causing bus errors again. Any controller that never became active in the time interval when the bus error count changed from HIGH-to-LOW-to-HIGH becomes a candidate for the fault-active controller.

When the bus error count on the CAN bus from the CAN controller is not less than the low bus error count threshold $Th_{error-low}$ for error counts from j=1 through k (336)(0), it is determined whether the count k was equal to 1 (338). If the count k was equal to 1 (338)(1), a fault pending flag is set (F_Pending=1) (339), and the present iteration ends (350). The fault pending flag (F_Pending=1) indicates that the controller was inactive due to being in the bus-off error status, but another iteration is needed to check whether the bus error count will be low the next iteration.

Once a controller becomes inactive, it is checked to determine whether the controller is inactive due to bus errors causing the controller to reach a bus-off error status. If not, a topology-based algorithm is employed to diagnosis other faults. Otherwise, the system checks to determine the bus error count is low after the controller reaches a bus-off error status. If yes then the fault-active controller is among the inactive controllers and the fault flag is set (F_Flag=1). When another iteration is needed to check the low bus error count, the fault pending flag is set (F_Pending=1). The controller isolation process 300 waits for execution of another cycle to verify whether the bus error count will be low after the controller reaches bus-off error status. If the bus error count is low for the next iteration then the fault flag is set (F_Flag=1). Otherwise the fault pending flag is reset (F_Pending=0) after the next iteration. If the count k was not equal to 1 (338)(0), this iteration ends (350).

Figure 4:
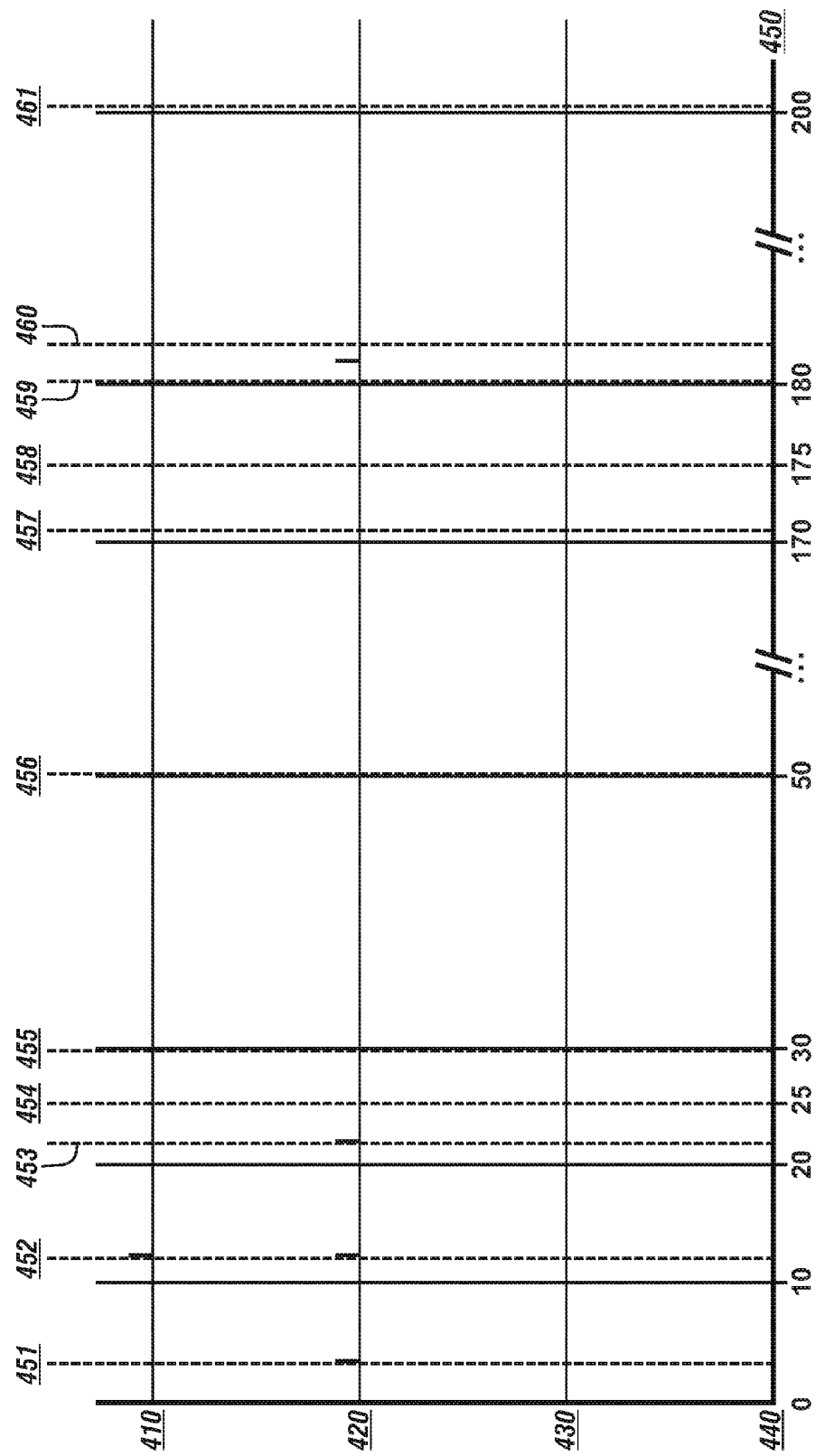
FIG. 4 illustrates operation of the controller isolation process of FIG. 3, wherein one of a plurality of controllers is a fault-active controller, in accordance with the disclosure.

FIG. 4 graphically shows operation of the controller isolation process 300 of FIG. 3, wherein one of a plurality of controllers is a fault-active controller. The depicted data includes data associated with operation of a first controller $C_1$ 410, a second controller $C_2$ 420, a third controller $C_3$ 430, and a monitoring controller 440 in relation to time 450. The first controller $C_1$ 410 is configured to send out a CAN message with a message period of 10 ms. The second controller $C_2$ 420 is configured to send out a CAN message with a message period of 20 ms. The third controller $C_3$ 430 is configured to send out a CAN message with a message period of 30 ms. The monitoring controller 440 detects whether the aforementioned controllers are active or inactive by monitoring CAN messages on the bus with different time-out values. The time-out values are preferably 2.5 times the corresponding message period, i.e., 25 ms for the first controller $C_1$ 410, 50 ms for the second controller $C_2$ 420, and 75 ms for the third controller $C_3$ 430 in this embodiment. The monitoring controller 440 records the bus error count at each of the execution cycles. The controller isolation process 300 for monitoring the first, second, and third controllers is executed periodically with the execution cycle period ($T_d$) of 25 ms, which is determined in according with $T_d=2.5*\min\{10,20,30\}=2.5*10$ ms=25 ms.

Initially, there are no active faults in the aforementioned controllers. At time 451, the second controller $C_2$ 420 becomes fault-active, which is undetected. At time 452, the first controller $C_1$ 410 goes to bus-off error status after 32 failed message transmissions occurring after the 10 ms point. The 32 failed message transmissions are unknowingly caused by the active fault of the second controller $C_2$ 420. At time 453, the second controller $C_2$ 420 goes to bus-off error status after 32 failed message transmissions occurring after the 20 ms point. The 32 failed message transmissions are unknowingly caused by the active fault of the second controller $C_2$ 420.

At time 454, which occurs at the 25 ms point, the controller isolation process 300 executes, and returns the following results.

Error[4]=0
Error[3]=0
Error[2]=0
Error[1]=64
F_Flag=0
CF=$\{C_1, C_2, C_3\}$ Error[1], Error[2], Error[3], and Error[4] are the error registers recording the bus error counts for respective execution cycles and the F_Flag is the fault flag, which have been previously described with reference to the controller isolation process 300. Error[1] is a compilation of the failed message transmissions from the first and second controllers $C_1$ 410 and $C_2$ 420 for the previous cycle. Thus, there are CAN message errors at this point in time, and CF, i.e., the set of candidate fault-active controllers, includes all three of the controllers $C_1$, $C_2$, $C_3$ after this execution of the controller isolation process 300.

At time 455, the third controller $C_3$ 430 is able to successfully transmit a CAN message, since the second controller $C_2$ 420 is unable to corrupt the CAN message due to its bus-off error status. At time 456, which occurs at the 50 ms point, the controller isolation process 300 executes again, and returns the following results.

Error[4]=0
Error[3]=0
Error[2]=64
Error[1]=0
F_Flag=1
CF=$\{C_1, C_2\}$ No new message faults have occurred, and thus the Error[1] register clears, and the previous errors are moved into the Error[2] register. The set of candidate fault-active controllers CF includes only two of the controllers $C_1$ 410 and $C_2$ 420 after this execution of the controller isolation process 300 because controller $C_3$ 430 has successfully sent a CAN message at time 455. The controller isolation process 300 iteratively executes each 25 ms, returning similar results, and the error registers eventually reset to 0 as no additional message errors are detected.

At time 457 occurring after 170 ms, the first controller $C_1$ 410 is reset from the bus-off error status after a wait-time of 160 ms. The first controller $C_1$ 410 successfully transmits a CAN message since the second controller $C_2$ 420 is unable to corrupt the CAN message due to its bus-off error status. At time 458, which occurs at the 175 ms point, the controller isolation process 300 executes again, and returns the following results.

Error[4]=0
Error[3]=0
Error[2]=0
Error[1]=0
F_Flag=1
CF=$\{C_2\}$ At time 459, the third controller $C_3$ 430 is able to again successfully transmit a CAN message, since the second controller $C_2$ 420 is at bus-off error status, and thus unable to corrupt the CAN message. At time 460, the second controller $C_2$ 420 is reset from the bus-off error status after a wait-time of 160 ms. The second controller $C_2$ 420 again goes to bus-off error status after 32 failed message transmissions. At time 461, which occurs at the 200 ms point, the controller isolation process 300 executes again, and returns the following results.

Error[4]=0
Error[3]=0
Error[2]=0
Error[1]=32
F_Flag=1
CF=$\{C_2\}$ The CF, i.e., the set of candidate fault-active controllers, includes only the controller $C_2$ after this execution of the controller isolation process 300. The controller isolation process 300 generates an output indicating the controller $C_2$ 420 is the fault-active controller.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring communications among a plurality of controllers signally linked to a communication bus of a controller area network, comprising:
   monitoring bus communications including determining bus error counts for a plurality of execution cycles;
   when a bus error count associated with message transmission from one of the controllers exceeds a predetermined threshold, prohibiting said one of the controllers from communicating on the communications bus for a predetermined period of time and including said one of the controllers in a subset of candidate fault-active controllers;
   removing from the subset of candidate fault-active controllers any of the plurality of controllers included within the subset of candidate fault-active controllers that successfully transmits a message; and
   isolating a fault-active controller based upon the subset of candidate fault-active controllers and the bus error counts.

2. The method of claim 1, wherein prohibiting said one of the controllers from communicating on the communication bus comprises prohibiting said one of the controllers from receiving messages and prohibiting said one of the controllers from transmitting messages for the predetermined period of time.

3. The method of claim 1, wherein prohibiting said one of the controllers from communicating on the communication bus comprises prohibiting said one of the controllers from communicating on the communication bus for a predetermined quantity of the execution cycles associated with a message transmission rate for said one of the controllers.

4. The method of claim 1, wherein isolating the fault-active controller based upon the subset of candidate fault-active controllers and the bus error counts comprises:
   determining the bus error count for each of a plurality of consecutive execution cycles, including a bus error count for an immediately previous cycle and a bus error count for a present cycle;
   monitoring a fault-active flag;
   comparing a high bus error count threshold to a sum of the bus error count for the immediately previous cycle and the bus error count for the present cycle; and
   when said sum of said bus error counts is greater than or equal to the high bus error count threshold and the fault-active flag has been set, identifying the fault-active controller based upon the subset of candidate fault-active controllers.

5. Method for monitoring a controller area network, comprising:
   monitoring bus communications among a plurality of controllers signally linked to a communication bus of the controller area network;
   determining a bus error count for each of a plurality of consecutive execution cycles,
   when a bus error count associated with message transmission from one of the controllers exceeds a predetermined threshold, prohibiting said one of the controllers from communicating on the communications bus for a predetermined period of time and including said one of the controllers in a subset of candidate fault-active controllers;
   removing from the subset of candidate fault-active controllers any of the plurality of controllers included within the subset of candidate fault-active controllers that successfully transmits a message on the communication bus; and
   isolating a fault-active controller based upon the subset of candidate fault-active controllers and the bus error counts.

6. The method of claim 5, wherein isolating the fault-active controller based upon the subset of candidate fault-active controllers and the bus error counts comprises:
   determining the bus error counts for two consecutive execution cycles;
   monitoring a fault-active flag;
   when a sum of the bus error counts for the two consecutive execution cycles is greater than or equal to a high bus error count threshold and the fault-active flag has been set, isolating the fault-active controller from the subset of candidate fault-active controllers.

7. The method of claim 5, wherein prohibiting said one of the controllers from communicating on the communication bus comprises prohibiting said one of the controllers from receiving messages and prohibiting said one of the controllers from transmitting messages for the predetermined period of time.

8. The method of claim 7, wherein said predetermined period of time comprises a period of time associated with a predetermined quantity of the execution cycles associated with a message transmission rate for said one of the controllers.

* * * * *